(12) United States Patent
Panto et al.

(10) Patent No.: US 9,162,753 B1
(45) Date of Patent: Oct. 20, 2015

(54) UNMANNED AERIAL VEHICLE FOR MONITORING INFRASTRUCTURE ASSETS

(71) Applicant: Southern Electrical Equipment Company, Inc., Charlotte, NC (US)

(72) Inventors: Andrew S. Panto, Charlotte, NC (US); Barry Wyeth Thomas, Charlotte, NC (US); Barry Craig Thomas, Charlotte, NC (US)

(73) Assignee: Southern Electrical Equipment Company, Inc., Charlotte, NC (US)

( * ) Notice: Subject to any disclaimer, the term of this patent is extended or adjusted under 35 U.S.C. 154(b) by 0 days.

(21) Appl. No.: 14/145,545

(22) Filed: Dec. 31, 2013

Related U.S. Application Data

(60) Provisional application No. 61/767,172, filed on Feb. 20, 2013, provisional application No. 61/747,594, filed on Dec. 31, 2012.

(51) Int. Cl.

| | |
|---|---|
| *B64C 19/00* | (2006.01) |
| *B64C 39/02* | (2006.01) |
| *B64C 27/08* | (2006.01) |
| *B64D 43/00* | (2006.01) |
| *G08G 5/04* | (2006.01) |
| *B64D 47/08* | (2006.01) |

(52) U.S. Cl.
CPC ............... *B64C 19/00* (2013.01); *B64C 27/08* (2013.01); *B64C 39/02* (2013.01); *B64D 43/00* (2013.01); *B64D 47/08* (2013.01); *G08G 5/04* (2013.01)

(58) Field of Classification Search
CPC ........ B64C 19/00; B64C 27/08; B64C 39/02; G08G 5/04; B64D 43/00; B64D 47/08
USPC .................................................. 701/3, 11, 16
See application file for complete search history.

(56) References Cited

U.S. PATENT DOCUMENTS

| | | | | |
|---|---|---|---|---|
| 7,195,200 | B2 * | 3/2007 | Yamane ..................... | 244/76 R |
| 7,302,316 | B2 * | 11/2007 | Beard et al. ................. | 701/11 |
| 2009/0306840 | A1 * | 12/2009 | Blenkhorn et al. ........... | 701/16 |
| 2010/0121503 | A1 * | 5/2010 | Sundqvist ..................... | 701/11 |
| 2010/0152933 | A1 * | 6/2010 | Smoot et al. ................. | 701/16 |
| 2012/0078451 | A1 * | 3/2012 | Ohtomo et al. .............. | 701/15 |
| 2012/0262708 | A1 * | 10/2012 | Connolly .................. | 356/237.2 |

FOREIGN PATENT DOCUMENTS

| | | | | |
|---|---|---|---|---|
| CN | 203094447 U | * | 7/2013 | ............. B64C 39/02 |
| CN | 203219298 U | * | 9/2013 | ............. H04B 7/155 |

OTHER PUBLICATIONS

Wang, B. et al.; Power Line Inspection with a Flying Robot; 2010 1st International Conference on Applied Robotics for the Power Industry; Oct. 5-7, 2010; ISBN 978-4244-6635-1.*

(Continued)

*Primary Examiner* — Mary Cheung
*Assistant Examiner* — Brian P Sweeney
(74) *Attorney, Agent, or Firm* — Sara C. Kanos; Nexsen Pruet, LLC

(57) ABSTRACT

An unmanned aerial vehicle and associated methods for inspecting infrastructure assets includes a multirotor, electrically driven helicopter apparatus and power supply; a flight computer; positioning and collision avoidance equipment; and at least one sensor such as a camera. The flight computer is programmed for automated travel to and inspection of selected waypoints, at which condition data is collected for further analysis. The method also includes protocols for segmenting the flight path to accomplish sequential inspection of a linear asset such as a power line using limited-range equipment.

14 Claims, 3 Drawing Sheets

(56) References Cited

OTHER PUBLICATIONS

"EADS Concept Diesel-Electric Hybrid Helicopter Features EcoMotors OPOC Engines; Up to 50% Less Fuel Consumption Than Conventional Twin-Turbine Helicopter"; GreenCarCongress.com Jun. 8, 2010; http://www.greencarcongress.com/2010/06/eads-concept-dieselelectric-hybrid-helicopter-features-ecomotors-opoc-engines-upto-50-less-fuel-con.html.*

SAE.org; "Secrets of Ricardo's new UAV engine may spawn range-extender for EVs"; Jun. 21, 2010; http://articles.sae.org/8424/.*

* cited by examiner

UNMANNED AERIAL VEHICLE FOR MONITORING INFRASTRUCTURE ASSETS

CROSS-REFERENCE TO RELATED APPLICATIONS

This application claims the benefit of U.S. Provisional Patent Application Ser. No. 61/747,594, filed Dec. 31, 2012, and U.S. Provisional Patent Application Ser. No. 61/767,172, filed Feb. 20, 2013, the entirety of which applications are incorporated herein by reference.

FIELD OF THE INVENTION

The present invention relates to unmanned aerial vehicles and, more particularly, to an unmanned vehicle especially adapted to perform aerial inspection and monitoring of infrastructure assets including electrical transmission lines, rail lines, pipelines, fence lines, and associated right-of-ways.

BACKGROUND OF THE INVENTION

Electric utilities and owners or operators of other types of infrastructure lines, such as rail lines, pipelines, and the like, typically use airplanes, helicopters, and ground-based vehicles to inspect and monitor those lines and their associated right-of-ways. Regular inspection of these items is necessary or helpful to detect and document problems; to identify and reduce equipment failures; to detect encroachments onto right-of-ways, theft, vandalism, and terrorism threats; to ensure safe operating conditions; and to plan and prioritize scheduled or emergency maintenance.

There are numerous drawbacks associated with existing methods. The use of conventional methods is costly and time-consuming. For example, the operating cost associated with helicopter monitoring may exceed $1,000 per hour. Manned aerial inspection may expose the inspectors and the public to danger, particularly because the inspection process often requires low-altitude flying to enable detailed inspections, and operating under those conditions can reduce safety margins. By contrast, inspection using ground-based vehicles, while somewhat safer, poses its own risks. Ground inspection requires a great deal of additional time for travel to inspection sites, and access to those sites may be limited or obstructed by forest growth, watercourses, or obstacles, particularly when a natural disaster has caused downed trees and other hazards.

Manned aerial inspection consumes significant amounts of fuel, which poses an emissions hazard in addition to the cost of fuel. It may additionally be difficult if not impossible to access tight locations to gather detailed views around and under towers, or around other structures such as buildings and bridges. Inspections must also be carefully planned to occur within the range of appropriate landing sites, so that inspecting some lines may require longer-range, more expensive vehicles.

Moreover, manned aerial inspection requires trained and licensed pilots, who must concentrate on tasks associated with flying, in addition to utility personnel who must ride alongside, to view the lines under inspection and to direct operations. These personnel are in addition to those typically required to review and evaluate video in order to discovery and document problems for follow-up.

All of the foregoing drawbacks tend to make frequent inspection of lines and right-of-ways cost-prohibitive, which leads to less consistent operation and in some cases operating conditions that are not as safe as possible. With access to more efficient mechanisms for conducting aerial monitoring, more frequent inspection and monitoring could be undertaken, which would in turn make regular and exceptional maintenance easier to complete and make operation more consistent and safer overall.

SUMMARY OF THE INVENTION

In view of the aforementioned problems and needs, and further in view of such advantages as will be made clear below, the present invention includes an unmanned aerial vehicle apparatus for conducting inspections of infrastructure assets. Although the present invention is capable of substantial utility with respect to many kinds of infrastructure systems, including rail lines, pipelines, roadways, fence lines, and the like, and while there is no intention to limit its operation by field, the present invention is particularly useful when addressing the problems associated with monitoring of transmission lines by electric utilities.

The present invention includes a small, preferably electrically powered multirotor helicopter that is capable of relatively long flight times along utility lines, as well as hovering and rotational operations, while providing a stable platform for a camera. The camera is a lightweight, high-resolution video camera capable of capturing data in the optical as well as infrared and ultraviolet bands and recording that data in memory.

The present invention also includes a GPS guidance system that is capable of being programmed to fly autonomously through a series of waypoints based upon coordinates and elevations of points of interest such as utility pole structures. The guidance system is also programmable with routines for detailed maneuvering to accomplish particular camera angles at those points of interest in order to maximize the effectiveness of the inspection.

The present invention further includes a collision avoidance system that may rely on radar, sonar, optical recognition, or other means by which obstacles are detected and avoided.

In an alternative embodiment, the present invention is driven electrically, i.e., using an electric motor, for precise control, but the power structure also includes a range extender, such as a generator, that is used to recharge batteries in order to increase the range of operations for the drone. Such a range extender may consume gasoline, diesel, compressed natural gas, or liquefied petroleum gas, or any other suitable fuel. Alternatively, the range extender may include a fuel cell mechanism for recharging the batteries or for delivering electrical power directly to the electric motor.

The present invention will preferably be suitably substantial and durable to allow for operation in adverse weather conditions.

Another feature of the invention includes a method for conducting inspections of utility lines and right-of-ways. In that method, an unmanned aerial vehicle is programmed to travel along a predetermined flight path, wherein the flight path is determined based upon the configuration of the lines and the particular features to be inspected, any known obstructions such as towers and other structures as well as guy wires. The vehicle is provided with a high resolution camera as described above, which is used to record video of the items to be inspected, as well as a memory for storing that video. The vehicle is then operated along the flight path, gathering the necessary data, and recovered at a predetermined landing site.

The method of the present invention includes a number of preprogrammed waypoint operations for ease of programming and planning. Because the vehicle is necessarily limited in its range, the selection of waypoint operations of known duration and power consumption allows the known range to be fully planned and maximally utilized.

The method of the present invention may also include the use of multiple vehicles to conduct a series of inspections along a given line. In that method, a first vehicle travels along and gathers data from a first segment, then at the recovery site a second vehicle is launched to travel along and gather data from a second segment. While the second vehicle is gathering data, and the utility inspector is traveling to the next landing site, data from the first vehicle is removed, and the first vehicle is prepped to inspect a third segment, such as by changing batteries, refueling, loading new programming, and performing any required maintenance.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

An important part of the effectiveness of an inspection system such as the type described herein, as well as a factor that increases the utility and suitability of the present invention to the task of utility and other line inspections, is the ability of an aerial system to maneuver within the environment to and around the inspection point without incurring damage to itself or to articles within the environment. While some of the obstacles may be mitigated or minimized by the establishment of a consistent utility right-of-way, thus allowing a free and clear flight path above and to the sides of the lines and towers of the line under inspection, during a detailed inspection a drone according to the present invention may nevertheless encounter obstructions that must be avoided if operation is to be successful and maximally useful. In a typical electrical distribution arrangement, obstructions that may cause damage, or be damaged, include the transmission lines themselves and the support structures for those lines, as well as tap lines, perpendicular crossings, low level guy wires, parallel transmission lines, cell towers, and numerous other types of structures. The GPS coordinates of these potential obstructions can be documented through known methods, and in fact many utilities have already compiled this information to one degree or another.

Of course, a substantial portion of the usefulness of the present invention is in its ability to access and document the condition of particular points of interest. An electric utility company, for example, will ordinarily know the locations of switchgear, transformers, and other such points of interest, and so those items will be readily documentable as above.

In addition to planned inspections of particular points of interest, the utility will ordinarily desire to detect a number of other conditions apart from inspections of specific points of interest. These conditions may include (a) encroachment on utility-owned right-of-ways as a result of construction or vegetation growth into the clearing; (b) failures of electrical insulations resulting from damage or contamination; (c) broken cable strands; (d) damage occurring as a result of vandalism or accidental action, such as from gunshots; (e) deterioration of, damage to, or absence of phase spacers or marker balls; (f) tampering with towers by vandals or terrorists; (g) sources of corona or arcing; (h) hot spots caused by leakage current or high-resistance connections; and (i) transformer high-temperature failure.

Those skilled in the art to which the present invention relates will recognize that myriad other conditions of interest may be detected and inspected through the use of the present invention, which is not intended to be limited to the conditions described herein.

Figure 1:
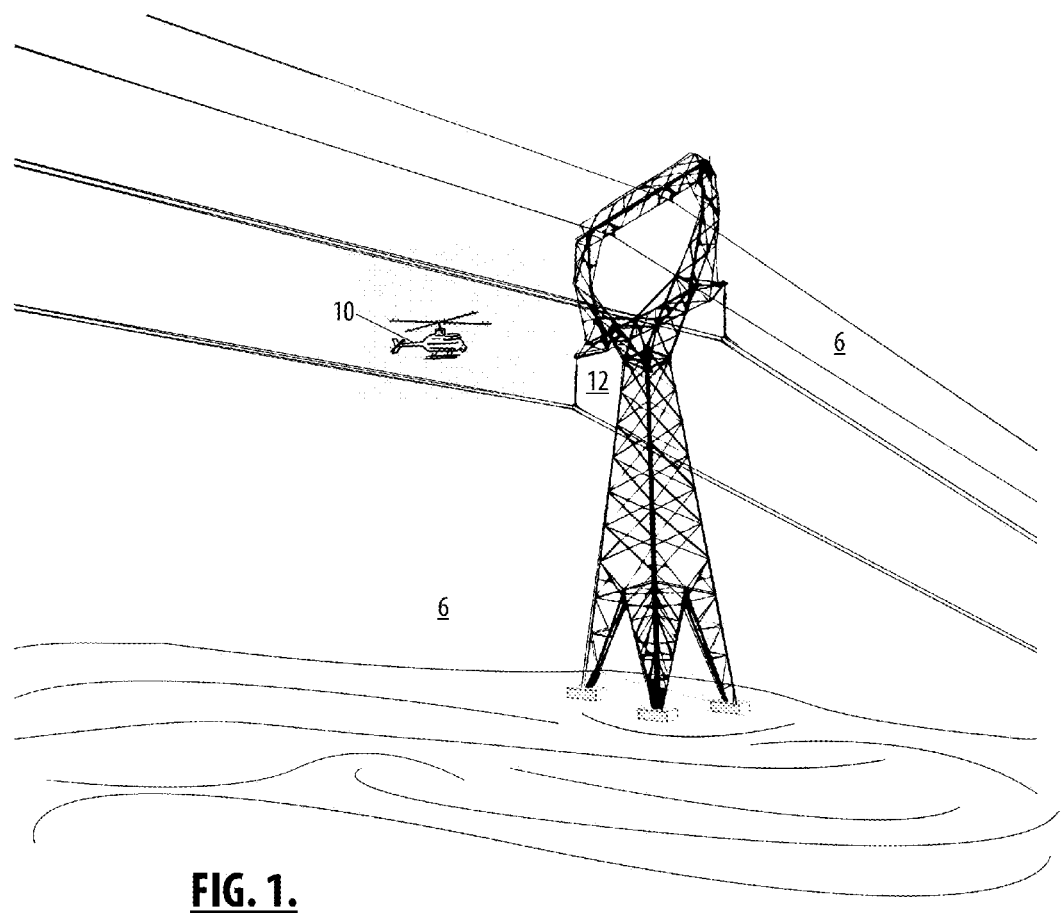
FIG. 1 is an environmental view of a device according to the present invention in operation.

Referring now to the drawings, and particularly to FIG. 1, in one potential arrangement, the present invention includes a small, electrically powered multi-rotor helicopter 10 weighing perhaps 20-25 kg and having a length of no more than about one meter, although the particular size of the device itself may vary outside these limits without departing from the scope of the invention, according to the arrangements necessary to particular operations. As shown in FIG. 1, the helicopter 10 is conducting an inspection of an electric power transmission line 8 in a remote field 6. A helicopter is particularly suitable for the task because of its ability to fly both vertically and horizontally, to hover, and to rotate, each of which operations will ordinarily be required to accomplish the necessary tasks to obtain a close-up view of equipment 12 in use on the power line 8.

The helicopter is designed for programmable, autonomous operation wherein a series of waypoints and operations may be identified by reference to GPS coordinates and pre-determined maneuvering routines, and the helicopter will, in operation, progress through the waypoints and operations as programmed, with exceptions as noted below. For purposes of this description, a "waypoint" is generally defined as a particular point of interest, while an "operation" refers to maneuvering of the drone to a particular position to accomplish, for example, a particular camera angle.

Figure 2:
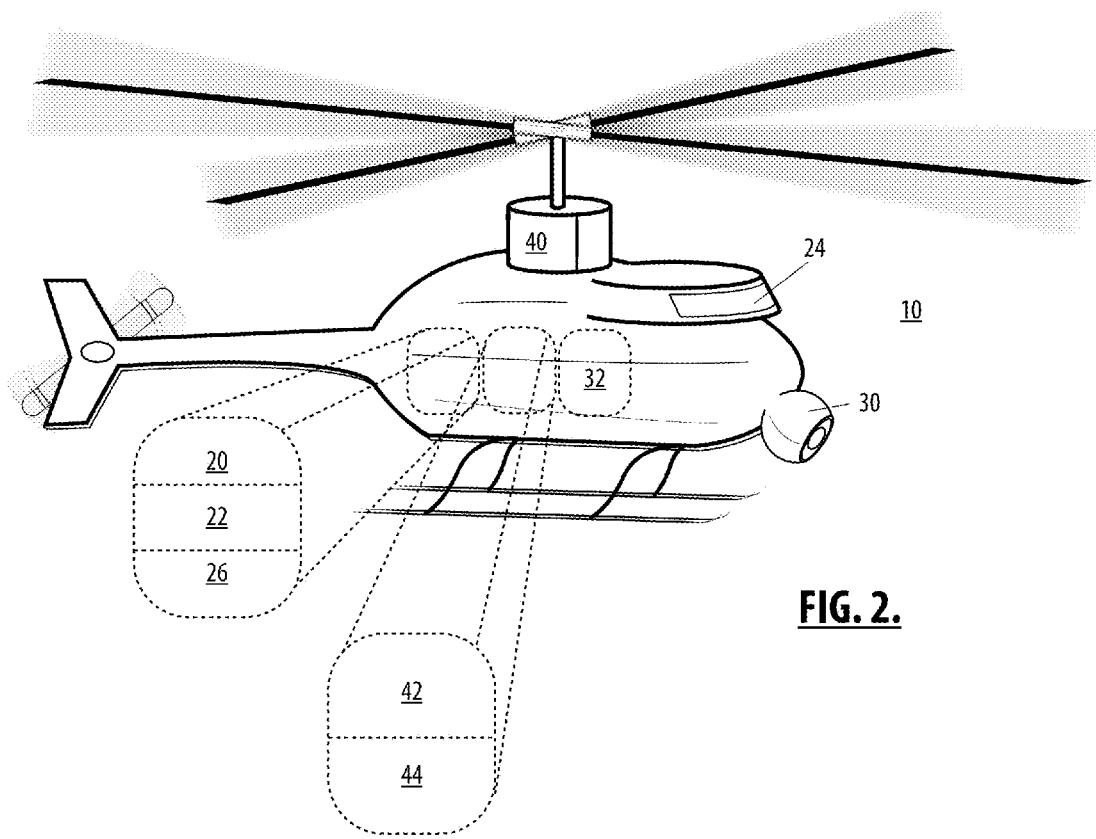
FIG. 2 is a detailed, partially schematic view of a device according to the present invention.

Referring now to FIG. 2, a helicopter 10 according to the present invention is shown in a lateral, partially schematic perspective view. The helicopter is principally under the control of a flight computer 20 that is programmable with travel and maneuvering instructions that coordinate with input from a GPS receiver 22 (depicted schematically). The helicopter 10 may also be provided with a collision avoidance system 24 based upon radar, sonar, optical differentiation and recognition, or another suitable system. The collision avoidance system 24 is adapted to recognize unforeseen obstructions and to supply input, in real time, to the flight computer so as to prevent a collision and resulting losses (whether to the drone itself, to the thing collided against, or to other items or persons as collateral damage).

The helicopter may be provided with a gyroscope 26 (depicted schematically) or other stabilization apparatus to ensure that video information it obtains is viewable in focus and in detail for maximum utility.

The helicopter is also preferably provided with at least one sensor, such as one or more digital cameras 30. Although FIG. 2 depicts only a single camera unit, depending upon the application, multiple cameras 30 or other data acquisition equipment may be mounted upon the helicopter 10. The cameras 30 are capable of receiving and recording video or other sensor data onto a writable data unit such as a computer hard drive 32, which coordinates the video data with position data from the control apparatus 20. Because information outside the visible band may be useful to the utility, the sensor 30 may include infrared or ultraviolet capabilities, or both, typically of the false-color image variety, as well as the ordinary optical range, and may incorporate sound. Depending on the maneuvering requirements, each camera 30 may be provided with PTZ (pan, tilt, zoom) capabilities, also under control of the flight and inspection plan programming, and multiple cameras may be mounted at various locations on the drone. The cameras 30 may be gimbal-mounted for added fine-control image stability, particularly under adverse weather conditions. In a preferred embodiment for a utility application, the system will include a visible light camera, a heat-sensing infrared camera, and an ultraviolet camera primarily for detecting corona discharge, with filters applied as necessary to pinpoint particular conditions of interest.

Figure 3:
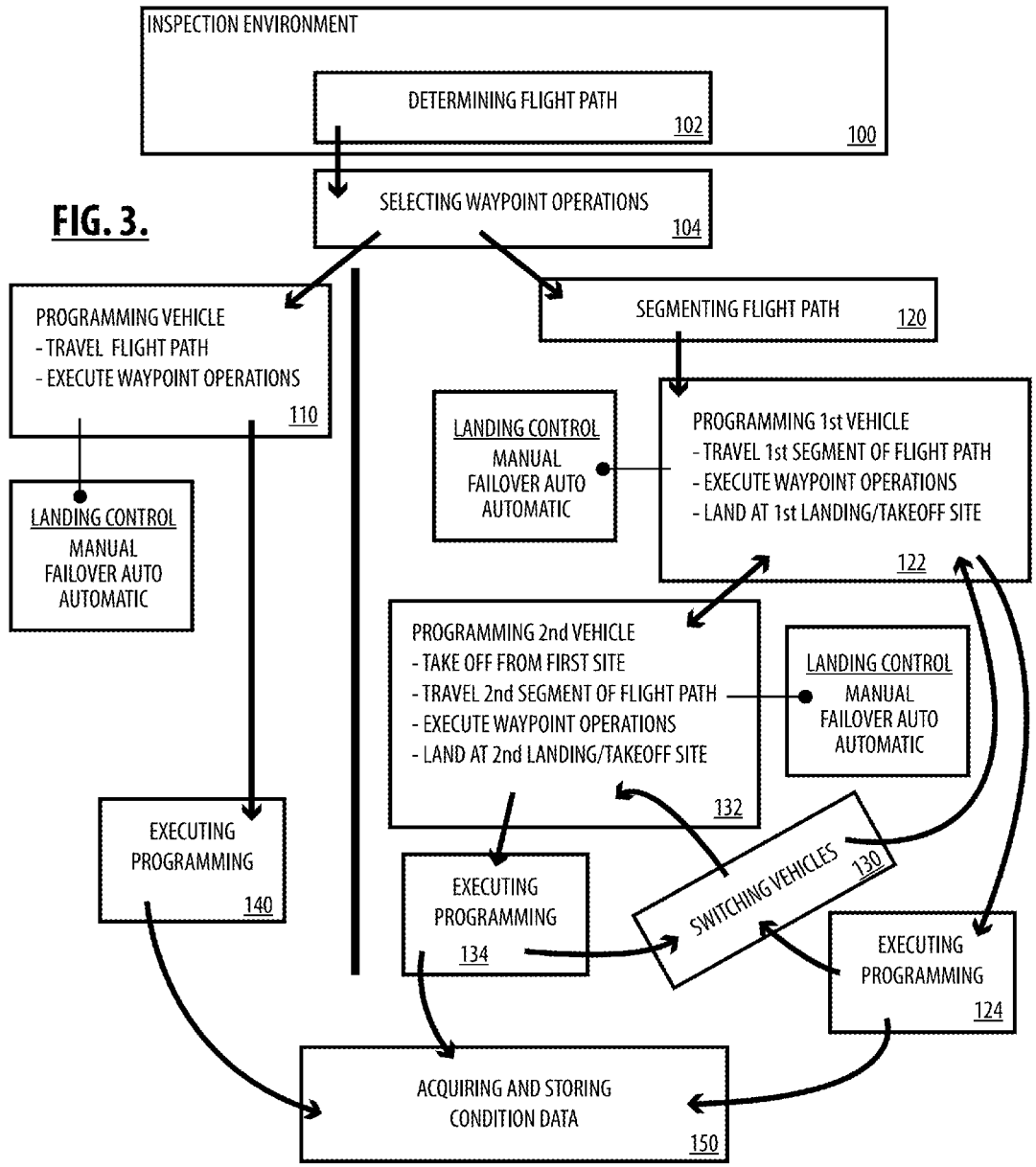
FIG. 3 is a flow chart depicting steps of a method according to the present invention.

Referring now to FIG. 3, a method according to the present invention is depicted in a flow chart. Autonomous operation will preferably begin with the establishment of detailed maps of transmission lines, including GPS coordinates (including elevations) of pole and line locations, any known obstructions, deviations from the standard right-of-way, and any equipment of special interest, as part of the inspection environment 100. Based upon this information, a detailed flight and inspection plan will be established 102. In order to accomplish the particular mission, a number of waypoint operations will be selected 104 to occur along the flight path. Depending upon the selections made at steps 102 and 104 and the capacity of the equipment being used, the inspection vehicle will be programmed 110 to travel along the flight path and execute the selected waypoint operations 140 in a single series. Most of the time, the capacity of the equipment and the amount of information sought to be gathered will dictate that the flight path be segmented 120, according to the detailed maps, the number and complexity of operations that must be performed to complete the inspection, the maximum flying time, and potential takeoff/landing sites. Next, the detailed operational routines are programmed 122 (into the first vehicle for the first segment of the flight plan) so as to occur at each point of interest under inspection, such as poles or other structures or equipment sites. These routines may involve the taking of additional images or measurements from any angle above, to the side of, around, or below the point of interest, according to the inspection requirements.

The programming of the flight plan may be made easier through the development of a number of standard or stock operations that may be deployed at a given waypoint. Such operations may include raising (or lowering) to a given height, flying in a circle with a given radius, rotating through a given angular sweep, adjusting the camera angle relative to the vehicle, and the like. Most of the linear movement of the vehicle will be accomplished through GPS control. The operations may be programmed according to particular GPS coordinates or given relative to the takeoff point.

The flight plan will ordinarily also include overview video taken between waypoints from a flight path directly above the transmission line or shield wire, so as to cover the right-of-way and the condition of the cables themselves. Flight speed is maximized, or at least optimized, between structures or waypoints and reduced to a hover at pole and equipment locations to allow for greater details and additional views or camera angles.

In segmented operation, a ground-based crew will be tasked with managing the deployment of the drone in the field and securing data when the flight plan is complete. At step 124, the crew will launch the first prepared drone from a designated point (which will acquire and store condition data at step 150 while executing the flight plan), then drive to the predetermined landing location and await the launched drone's arrival. When the drone arrives, at step 130, the drone's collected data is offloaded, a fully charged power pack is installed, and instructions for the next segment are loaded into the on-board computer 132. The drone is re-launched 134 and the process is repeated until the inspection is completed.

Alternatively, as is shown in FIG. 3, the crew may use two or more drones in alternating fashion to minimize the time between landing and takeoff. At the landing site, a second, pre-prepared drone may be launched 134 immediately after the first drone is collected, and the first drone may be serviced while the crew is driving to the next landing zone.

It may prove useful, for purposes of safety and the security of the vehicle and the data stored therein, to arrange the programming of the drone so as to require the drone, upon arrival at the designated landing point, to hover at some distance above the landing point. Such an arrangement would allow the operator to require, or at least strongly prefer, that the drone be landed under manual control. If the drone should arrive at the landing zone before the ground-based operations team arrives, the drone would not land until "cleared" for landing through manual control. This allows for an additional level of human-level decision making as to the landing operations. The drone may additionally be programmed to monitor its own fuel or power consumption so that a controlled but automatic landing is initiated before the available power or fuel runs out, thus preventing a dead stick crash. These three landing control options may be designated as "manual," "automatic," or "failover automatic."

Regardless of the number of drones used, the data collected by them at step 150 is then used to identify problem areas and priority level, supplying all supporting data (including GPS coordinates and digital imagery) to pinpoint the problem. While a larger utility may wish to run its own inspection system, these operations are particularly suited to an outsourced arrangement, whereby the utility supplies the aforementioned location data and inspection requirements, and a drone company manages the drone operations according to the utility's requirements, including by analyzing the collected data and providing written reports to the utility company.

Because of the autonomous or semi-autonomous nature of the operation described above, those skilled in the art to which the present invention relates will recognize that exceptions to the plan will occur from time to time. Collision avoidance, wherein the drone deviates somewhat from the flight plan but otherwise manages to stay aloft, will necessitate the programming of recovery routines whereby the helicopter resumes normal operations after the collision is avoided. In other situations, the drone may be unable to avoid the collision. The drone may be subjected to intentional attack by a misguided individual, causing it to crash. The drone may lose its GPS signal, or it may encounter an unanticipated error in programming that renders it incapable of completing the mission. The drone may experience a power, computer, or camera failure. Under any of these conditions, the drone may be able to continue flying, either over its planned route or for a short time sufficient to execute a soft landing. Ideally, the computer will be programmed to recognize exception conditions, to determine whether to abort its mission by flying directly to the landing site or to abort the mission by executing an unplanned landing. When the helicopter must land at an unplanned location (or crashes), recovery of this valuable equipment is essential. To aid in recovery, the system will be preferably provided with a GPS transponder designed to signal its location or more sophisticated communications equipment designed to "phone home" to indicate distress and provide a location, where possible.

Although the description above is focused on autonomous operation based upon pre-programmed routines, with the addition of appropriate communication apparatus, the drone could be adapted to permit full-time or temporary real-time operation, whereby camera and flight data are provided to a remote operator, who may issue commands to the drone that are executed apart from any pre-programmed flight plan. Such an arrangement will undoubtedly significantly increase the construction and operating costs of an unmanned aerial system such as that described herein and may reduce the reliability of operation by introducing uncertainty and a greater possibility of human error, but it would provide the system with the capability of real-time monitoring and adjustment in uncertain conditions, and it would significantly increase the utility of the system in certain applications.

The discussion of the preferred embodiments of the present invention has heretofore focused on the drive mechanism 40 (see FIG. 2) of the vehicle being an electric motor. Electric motors offer certain present advantages, and chief among them from an operational standpoint is that an electric motor may be operated with precise power output to produce a given operation in a highly predictable and responsive manner. However, an electric motor must have access to electric power. Electric power may be provided through a battery 42, but present and currently foreseeable battery technology may not provide for a sufficient range of operations to be useful.

To solve this problem, a range extender 44 may be employed to generate additional electric power that may be used to drive the vehicle. For example, an engine that burns gasoline, diesel fuel, compressed natural gas, or liquefied petroleum gas, or another similar fuel, might be made sufficiently lightweight to be carried onboard the drone yet capable of transforming a fuel source into electrical current. Alternatively, a fuel cell generator may produce electricity through chemical processes. Whether produced through an internal combustion engine or a more advanced mechanism such as a fuel cell, the electrical current may be used to recharge the batteries, to deliver current directly to the electric motor, or both.

Although the present invention has been principally described as an electrically powered multirotor helicopter, the principles described herein could also be applied to a fixed-wing aircraft for certain applications, particularly where hovering and rotation operations are not needed. Depending on the application, a single-rotor helicopter could also be used, but the design would ordinarily sacrifice the stability associated with a multirotor craft. If stability is not an issue, a single-rotor craft may be suitable to improve upon other parameters that are of more importance to the task at hand.

The present invention provides numerous benefits over existing systems. The operation of a small, lightweight drone helicopter is significantly less expensive than full-size, manned helicopters as a function of distance. An unmanned, lightweight system fully eliminates the risk to pilots and other flying personnel. The incorporation of collision avoidance hardware and software greatly reduces the risk to personnel and assets on the ground, thereby also reducing potential liability to the public in the event of damage. Operation using electric power eliminates the high fuel consumption and emissions of helicopters. The small size of the drone, coupled with its high maneuverability, allows access to views and angles that are simply not possible with conventional monitoring apparatus.

The present invention also presents numerous practical and cost advantages. Because the system can be operated by a dedicated company as an outsourced service, no operational involvement by the utility is needed (other than providing existing map data and point of interest information, and specifying requirements). Specifically, utility personnel will not need to perform a detailed review of the entirety of aerial footage to identify problem areas. Instead, the dedicated drone company can provide detailed reports that identify problem areas, leaving utility personnel free to concentrate on performing needed maintenance.

Perhaps most importantly, the reduced costs associated with monitoring will allow the system to be inspected and monitored more frequently for the same or less cost. This will result in identifying potential problems sooner, thereby improving system reliability, reducing the frequency and duration of outages, and reducing the costs of maintenance by identifying and repairing minor problems before they escalate into major situations.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by any claims appended hereto and the equivalents thereof.

What is claimed is:

1. An unmanned aerial vehicle apparatus for conducting an inspection of selected points of interest within an infrastructure asset, comprising:
    A multirotor helicopter comprising an electric drive apparatus and at least one battery for supplying electric power thereto;
    A flight computer adapted to control the helicopter;
    A collision avoidance protocol for generating first input to the flight computer;
    A global positioning system receiver for generating second input to the flight computer; and
    A sensor and associated memory for acquiring and storing data from said sensor as part of the inspection, said memory receiving said second input from said global positioning system receiver and associating said second input with said data;
    Wherein the flight computer is programmed to direct the helicopter autonomously according to the inputs through a substantially predetermined flight path comprising a series of waypoints, the locations of which and maneuvering instructions are stored in said flight computer, said helicopter proceeding from each waypoint of said plural waypoints to a next waypoint of said plural waypoints in turn, then executing at said each waypoint said maneuvering instructions before proceeding to said next waypoint, to complete the inspection.

2. An apparatus according to claim 1, wherein the helicopter further comprises a range extended for extending operational range of the helicopter.

3. An apparatus according to claim 1, wherein the collision avoidance protocol includes one or more obstacle-detecting systems and predetermined maneuvering subroutines for generating the first input to the flight computer in order to override the predetermined flight plan and avoid a detected obstacle.

4. An apparatus according to claim 1, wherein the helicopter is capable of conducting hovering and rotational operations while providing a stable platform for the sensor.

5. An apparatus according to claim 1, wherein the sensor comprises a high-resolution video camera.

6. An apparatus according to claim 5, wherein the camera is configured to capture optical, infrared, and ultraviolet data.

7. An apparatus according to claim 5, wherein the camera is configured to acquire and record sound.

8. A multirotor helicopter for conducting an inspection of selected points of interest within an infrastructure asset, comprising:
   (a) an electric drive apparatus including rotors;
   (b) a battery in electrical connection with said electric drive apparatus;
   (c) a programmable flight computer adapted to operate and control said electric drive apparatus pursuant to a software program, wherein said software program includes a flight path including a series of waypoints and directions between each waypoint in said series of waypoints and a next waypoint in said series of waypoints, and a maneuver to be conducted at each waypoint, said flight computer configured to fly said computer in accordance with said flight path;
   (d) a global positioning system receiver having an output related to the position of said global positioning system receiver, said flight computer being configured to receive said output and to use said output in flying said helicopter in accordance with said flight path; and
   (e) sensors carried by said helicopter, said sensors configured for acquiring data, said data including video images; and
   (f) a memory in operational connection with said sensors and said flight computer, said flight computer configured for receiving and associating said data from said sensors with said output from said global positioning system receiver and storing said data and said output in said memory so that said memory contains said data and said output corresponding to said data,
   wherein said flight computer flies said electric drive apparatus autonomously according to said flight path proceeding from said each waypoint of said plural waypoints to said next waypoint of said plural waypoints in turn, then executing at said each waypoint said maneuver before proceeding to said next waypoint, until said inspection is complete.

9. The multirotor helicopter of claim 8, wherein said sensors include sound sensors.

10. The multirotor helicopter of claim 8, wherein said sensors include camera and wherein said cameras have filters thereon.

11. The multirotor helicopter of claim 8, wherein said flight computer is programmed to contain global satellite position locations of said waypoints, equipment, and obstructions along the flight path.

12. The multirotor helicopter of claim 8, wherein said maneuvers include raising and lowering to a given elevation, flying in a circle with a given radius, rotating through a given angular sweep, and adjusting said sensors with respect to said electric drive mechanism.

13. The multirotor helicopter of claim 8, further comprising a fuel cell to extend the range of said electric drive mechanism.

14. The multirotor helicopter of claim 8, further comprising a global satellite positioning transponder configured to send position location signals by which it can be located.

* * * * *